(12) United States Patent
Moore (10) Patent No.: US 11,799,157 B1
(45) Date of Patent: Oct. 24, 2023

(54) CAP FOR AN ANODE ASSEMBLY

(71) Applicant: NWCAT LLC, Grand Junction, CO (US)

(72) Inventor: Christopher L. Moore, Grand Junction, CO (US)

( * ) Notice: Subject to any disclaimer, the term of this patent is extended or adjusted under 35 U.S.C. 154(b) by 62 days.

(21) Appl. No.: 17/207,678

(22) Filed: Mar. 21, 2021

Related U.S. Application Data (60) Provisional application No. 63/003,071, filed on Mar. 31, 2020.

(51) Int. Cl.
| | |
|---|---|
| *F24H 9/45* | (2022.01) |
| *H01M 50/148* | (2021.01) |
| *H01M 50/172* | (2021.01) |
| *G01N 17/02* | (2006.01) |
| *F24H 1/18* | (2022.01) |

(52) U.S. Cl.
CPC ............ *H01M 50/148* (2021.01); *F24H 9/45* (2022.01); *H01M 50/172* (2021.01); *F24H 1/186* (2013.01); *G01N 17/02* (2013.01)

(58) Field of Classification Search
None
See application file for complete search history.

(56) References Cited

U.S. PATENT DOCUMENTS

| 2,473,290 A | * | 6/1949 | Millard | ................. | C25D 17/00 |
| | | | | | 204/212 |
| 4,957,616 A | * | 9/1990 | Ansuini | ................. | G01N 17/02 |
| | | | | | 204/196.06 |

\* cited by examiner

*Primary Examiner* — Carmen V Lyles-Irving
(74) *Attorney, Agent, or Firm* — FisherBroyles, LLP; Craig W. Mueller (57) ABSTRACT

Provided is an anode assembly cap for selective interconnection to a tank, for example. The anode assembly cap generally includes a flange with interconnected wall configured to surround at least a portion of an anode. When installed, the anode assembly facilitates electron transfer from the tank/anode assembly interface. The anode assembly creates a closed system with respect to the tank, wherein information transfer associated with the interconnection between the anode assembly and the storage tank is minimized or prevented.

12 Claims, 7 Drawing Sheets

CAP FOR AN ANODE ASSEMBLY

This application claims the benefit of U.S. Provisional Patent Application Ser. No. 63/003,071, filed Mar. 31, 2020, the entirety of which is incorporated by reference herein.

FIELD OF THE INVENTION

Embodiments of the present invention are generally related to anodes used to protect metallic objects from corrosion. More specifically, one embodiment of the present invention is an anode assembly mounting cap for use with oil/gas separator tanks.

BACKGROUND

Suppose two metals are present in an environment conducive to the flow of electrons (e.g., an electrolyte) and are joined together, either directly or via a mechanical connection (conductor). In that case, electrons will flow from the metal with more electro-potential (i.e., an anode) to the metal that has less electro-potential (i.e., a cathode). These four components, an anode, a cathode, electrolyte, and a conductor, create a corrosion cell.

Corrosion is generally the flow of electrons along a metallic surface, and each type of metal has a unique electro-potential that influences this flow. A list of metals, called the Galvanic Series, arranges metals according to how much electro-potential each metal contains. Corrosion occurs when an "active" portion(s) of a metallic object gives electrons to a portion(s) that has less electro-potential. The more active portion of the metallic object acts as an anode as it loses electrons, whereas the less active portions of the metallic object gain electrons and, thus, act as cathodes. Those of ordinary skill in the art will appreciate that corrosion is exacerbated by substances contacting the metallic object. For example, oil/gas separator tanks contain fluids, e.g., salt water or water laden with other chemical/minerals, that act as an electrolyte that facilitates electron transfer from one portion of the tank to a less active portion of the tank.

Molecules are removed from the anode as electrical current flows from an anode, through the electrolyte, to a cathode. Thus, an anodic portion of a metallic surface will eventually become thinner and thinner until a leak occurs. This type of corrosion can be prevented by introducing a foreign (non-native) anode with a greater electro-potential than the original metal. In operation, electrons will flow from the non-native anode, instead of from the anodic portion of the original metal (native anode), through the electrolyte, to the cathode. The result is that the non-native anode will corrode instead of the protected metallic surface.

Figure 1:
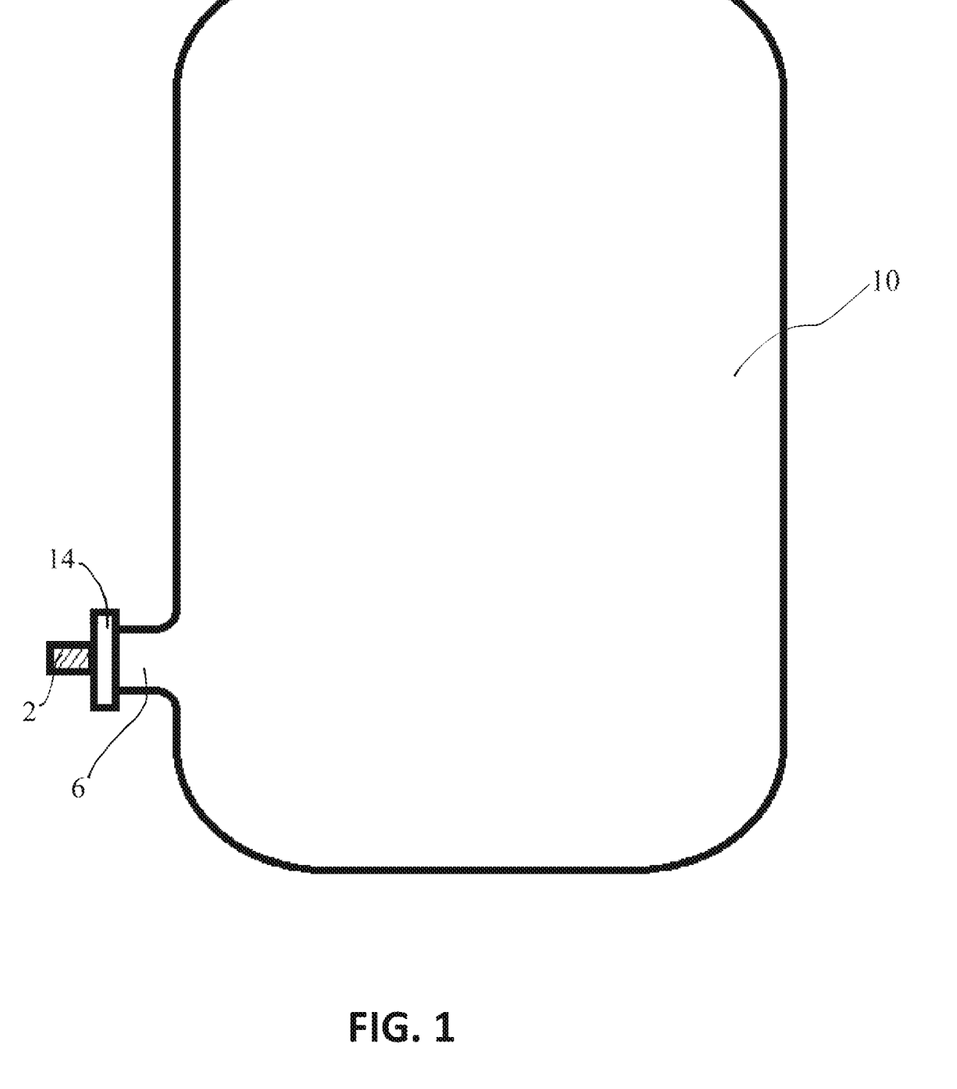
FIG. 1 is a general schematic of a separator tank with interconnected anode assembly.

Non-native anodes are used to protect steel from corrosion in many industries and applications. These anodes are configured for installation in numerous ways. One common use of this configuration is in oil and gas separators and heater treaters. For example, a galvanic anode is often attached to a separator tank and exposed to an electrolyte. Galvanic anodes are selected because they have a more active voltage than the tank structure's metal (typically steel). Galvanic anodes are configured for installation onto a separator tank in numerous ways. Commonly, a "groove-lock" (Victaulic-type) fitting is used to interconnect an anode assembly to a port or pipe nipple extending from the separator tank. FIG. 1 shows an example of an anode assembly 2 interconnected to a fitting 6 of a separator tank 10 with a clamp 14.

Figure 2:
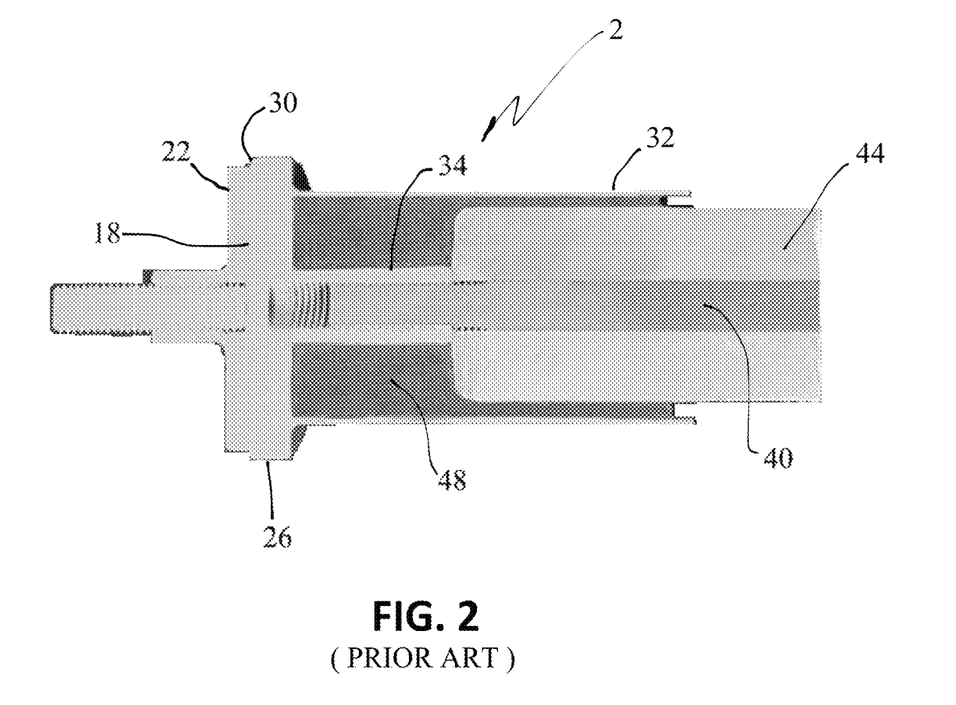
FIG. 2. is a cross-sectional view of an anode assembly of the prior art.

FIG. 2 shows an anode assembly 2 of the prior art that has a cap 18 comprised of an outer portion 22 and an inner portion 26, wherein the outer portion 22 has a diameter less than that of the inner portion 26, which defines a face 30. A wall 32 extends from the inner portion 26 to define an internal volume that receives an anode. A clamp secures the anode assembly to the separator tank (see, FIG. 7). The cap 18 also may employ an inwardly-extending boss 34 that selectively receives a captured rod 40 interconnected to the anode 44. This functionality allows the anode 44 to be removed and replaced, wherein the cap 18 and wall 32 can be used again. Normally, all or portions of the anode assembly's cap and wall are permanently affixed and made of fiberglass, which is often not ideal because of the harsh environments in which these assemblies are employed. This design requires filling the annulus between the inner wall surface and the anode/inner flange with epoxy 48. Although epoxy helps center the anode 44 within the wall 32, its presence makes refurbishment impossible.

Traditional anode assemblies that use fiberglass mounting caps have many drawbacks. Fiberglass is poorly suited for use in heater treaters or separators as caps can burn and are rated to 85 PSI, a pressure commonly exceeded in production vessels. Fiberglass caps often fail "soap tests," showing that while they may not leak oil, they do leak air and flammable gas. Fiberglass can also swell inside of a heater treater, making anode extraction very difficult. Fiberglass head anodes have a limited shelf-life and break down with prolonged sun exposure. Indeed, it is not recommended to use some fiberglass head anodes that have been in the sun longer than 12 months.

Another drawback is associated with the anode's method of manufacture. Traditional head anodes are made by sliding the cap over the anode core, and gluing the anode core into place. The method requires the manufacturer to ensure the glue is properly mixed, evenly dispersed, and that the anode is torqued to the cap correctly. Any human inconsistency/error in the process can allow the anode to fail inside a heater-treater/separator.

The applicant of the instant application has attempted to address the shortcomings of the prior art by fabricating anodes that utilize a fail-proof mounting head. The cap is made from durable steel and is "blind" in design, making leaks impossible. These anodes are suitable for use in applications of up to 1000 PSI. These mounting caps were manufactured by threading the cap directly to the anode core, eliminating any opportunity for human error to cause a leak or catastrophic failure. Further, capped anodes do not degrade in the sun and therefore do not have a limited shelf life.

SUMMARY OF THE INVENTION

It is one aspect of some embodiments of the present invention to provide an anode assembly that allows end-users who employ groove-lock style fittings to protect their equipment from corrosion. The contemplated anode assembly generally consists of a cap having a wall extending therefrom that generally corresponds to the internal diameter of a fitting extending from a separator tank. The wall of one embodiment is generally cylindrical. The cap of one embodiment of the present invention is made of steel and is designed to engage the fitting's outer edge, thereby creating a path for conducting electrons to an anode.

One embodiment of the present invention is constructed as a "blind" solution, so fluid transfer to the vessel exterior is impossible. Some prior art fiberglass anode assembly caps receive a treaded rod connected to an aluminum anode. The rod extends through the cap and is secured thereto with a nut. The anode is also secured to the cap's wall with glue and/or epoxy. As the anode degrades, the rod's threads are often exposed, creating a leak path, notwithstanding the glue and/or epoxy.

Embodiments of the present invention address the shortcomings of the prior art by using durable steel components with no penetrations that creates a closed system with respect to the metallic object, e.g., storage tank, to which the assembly is interconnected. Here, for example, the exterior portion of the rod, which is configured to accommodate a grounding wire, is welded to the cap and does not penetrate into the volume defined by the wall. Thus, no information transfer into or out of the storage tank is allowed, counter to prior art designs. A steel cap is inherently stronger than the interconnected vessel because a mounting flange portion of the cap is thicker than the vessel wall.

The anode assembly cap of one embodiment is made of steel, thereby allowing anode replacement as a single unit. For example, some embodiments of the present invention provide an anode with an internally threaded orifice that selectively engages a rod extending into the housing. The anode threads directly into the threaded rod, creating a solid mechanical bond. In other embodiments, the aluminum anode is provided with a threaded steel rod extending therefrom that is received within a boss extending into the cap's interior volume.

It is still yet another aspect of some embodiments of the present invention to provide an anode assembly that is easy to install in a separator tank, for example. More specifically, those of ordinary skill in the art will appreciate that anode assemblies are sometimes heavy and difficult to handle, and installation thereof onto a fitting extending from a separator tank may cause damage to the anode assembly and/or the separator tank fitting. Indeed, sometimes anode assembly installation is a two-person job. One embodiment of the present invention addresses this issue by providing selectively deformable ribs extending from the cap's wall. In operation, the ribs are deformed outwardly to increase the wall's outer diameter, which helps align the anode assembly as it is inserted into the fitting. The rids of one embodiment can be deflected outwardly with a screwdriver. This feature also may increase electron transfer between the two interconnected components. As described in further detail below, the selectively deformable ribs may be interconnected at each end thereof to the wall. In other embodiments, the ribs are only interconnected on one end to the wall. Further, a portion or the entirety of the ribs may be selectively removed from the wall to suit the installer's needs.

It should be understood that other mechanisms or devices for selectively increasing the outer diameter of the cap's wall are contemplated, such as a series of fixed or deformable fins spaced along the length of the wall, a sleeve placed over at least a portion of the wall, members affixed to the outer surface of the wall, a wire wrapped about the outer surface of the wall, a deformable ring placed about the outer surface of the wall, etc. Of course, portions of the member configured to increase the wall's outer diameter may be made of a compliant material to ensure a tight fit between the wall and the inner surface of the fitting. In another embodiment, the outer surface of the wall is at least partially threaded and receives at least one threaded collar of a predetermined thickness depending on the gap between the outer surface of the wall and the inner surface of the fitting.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description hereinbelow.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and drawing figures are to be understood as being approximations that may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

The following component list and associated numbering found in the drawings is provided to assist in the understanding of one embodiment of the present invention:

Component
2 Anode assembly
6 Fitting
10 Separator tank
14 Clamp
18 Cap
22 Outer portion
26 Inner portion
30 Face
32 Wall
34 Boss
40 Rod
44 Anode
48 Epoxy
102 Anode assembly
118 Cap
122 Outer portion
126 Inner portion
130 Face
132 Wall
136 Internal volume
140 Rod
144 Anode
148 Outer threaded segment
152 Nut
156 Rib
160 Inner wall
164 Flange
168 Groove
172 Clamp
176 Gasket It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 3-7 show an anode assembly 102 of one embodiment of the present invention that includes a cap 118 consisting of an outer portion 122 and inner portion 126 that define a face 130. The inner portion defines a surface that engages an outer surface of a flange or nipple associated with a fitting extending from the tank (see FIG. 7). The diameter of the outer portion 122 is greater than that of the inner portion 126, wherein the face 130 cooperates with a groove of the fitting extending from the separator tank. A wall 132 extends from the inner portion 126. The wall 132 provides an internal volume 136 that accommodates a threaded rod 140 configured to selectively receive at least one anode 144. In one embodiment of the present invention, the anode 144 has an outer diameter that closely matches the inner diameter of the wall 132. This functionality allows the anode 144 to be easily mated to the cap 118 during initial production or when the cap 102 is refurbished. This feature also allows for epoxy to be omitted. Those of ordinary skill in the art will appreciate that other selective interconnection methods may be used to interconnect the anode 144 to the cap 118 without departing from the scope of the invention. For example, the inner portion may possess a boss that extends into the interior volume 136 that selectively receives a threaded rod extending from the anode.

Figure 3:
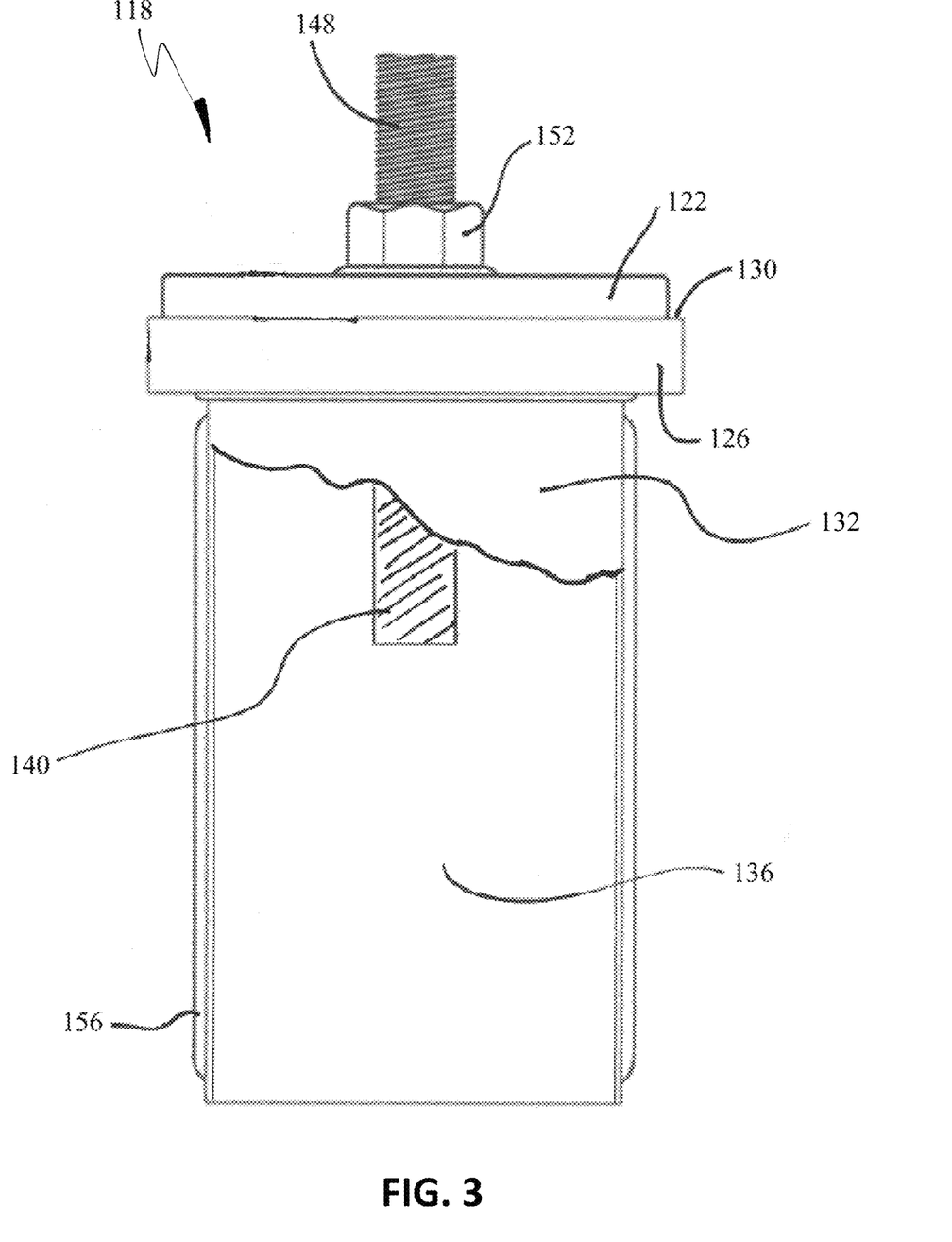
FIG. 3 is a front elevation, partial cross-sectional view of an anode assembly cap of one embodiment of the present invention.
Figure 4:
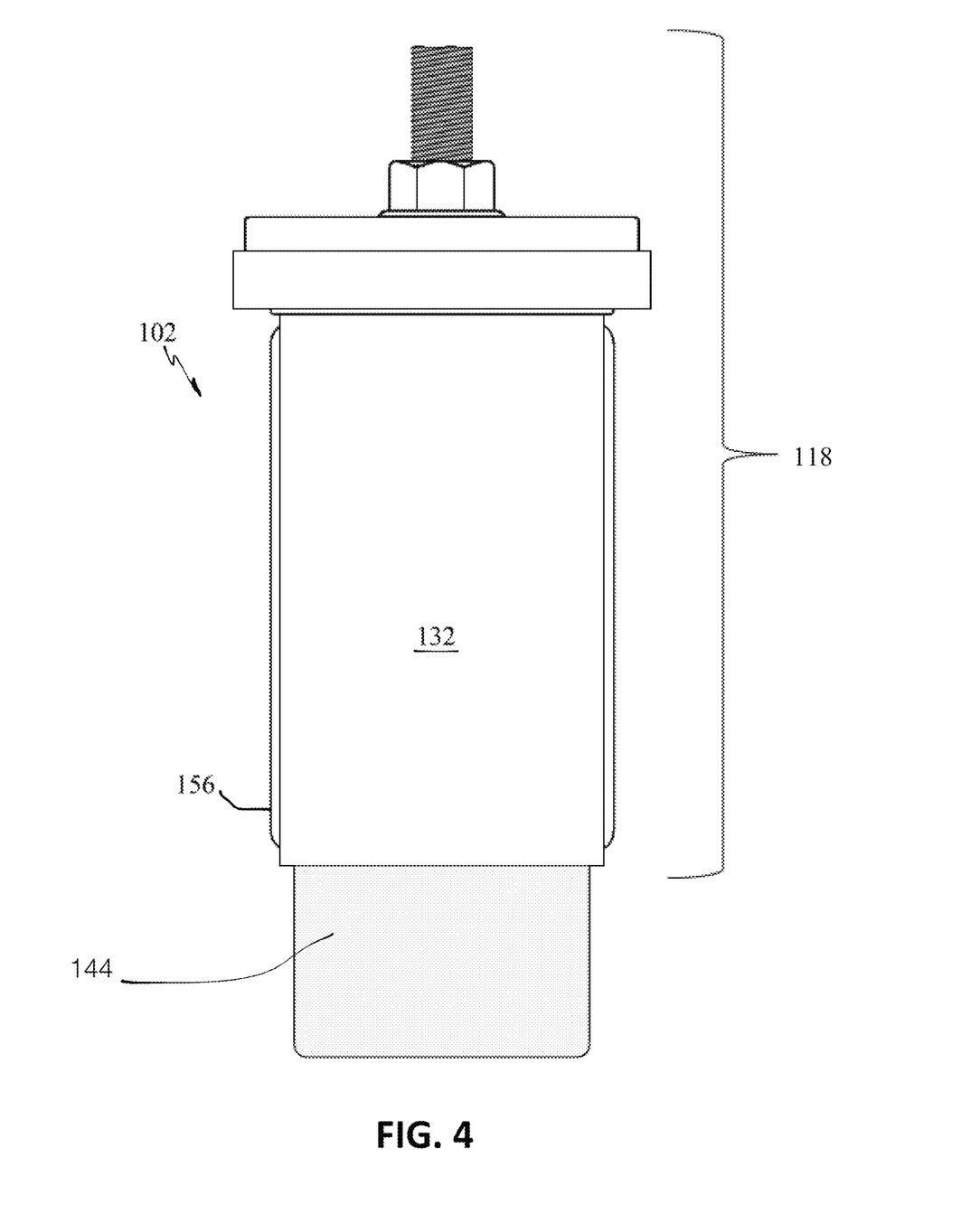
FIG. 4 is a front elevation view of the anode assembly comprising cap and anode of one embodiment of the present invention.
Figure 5:
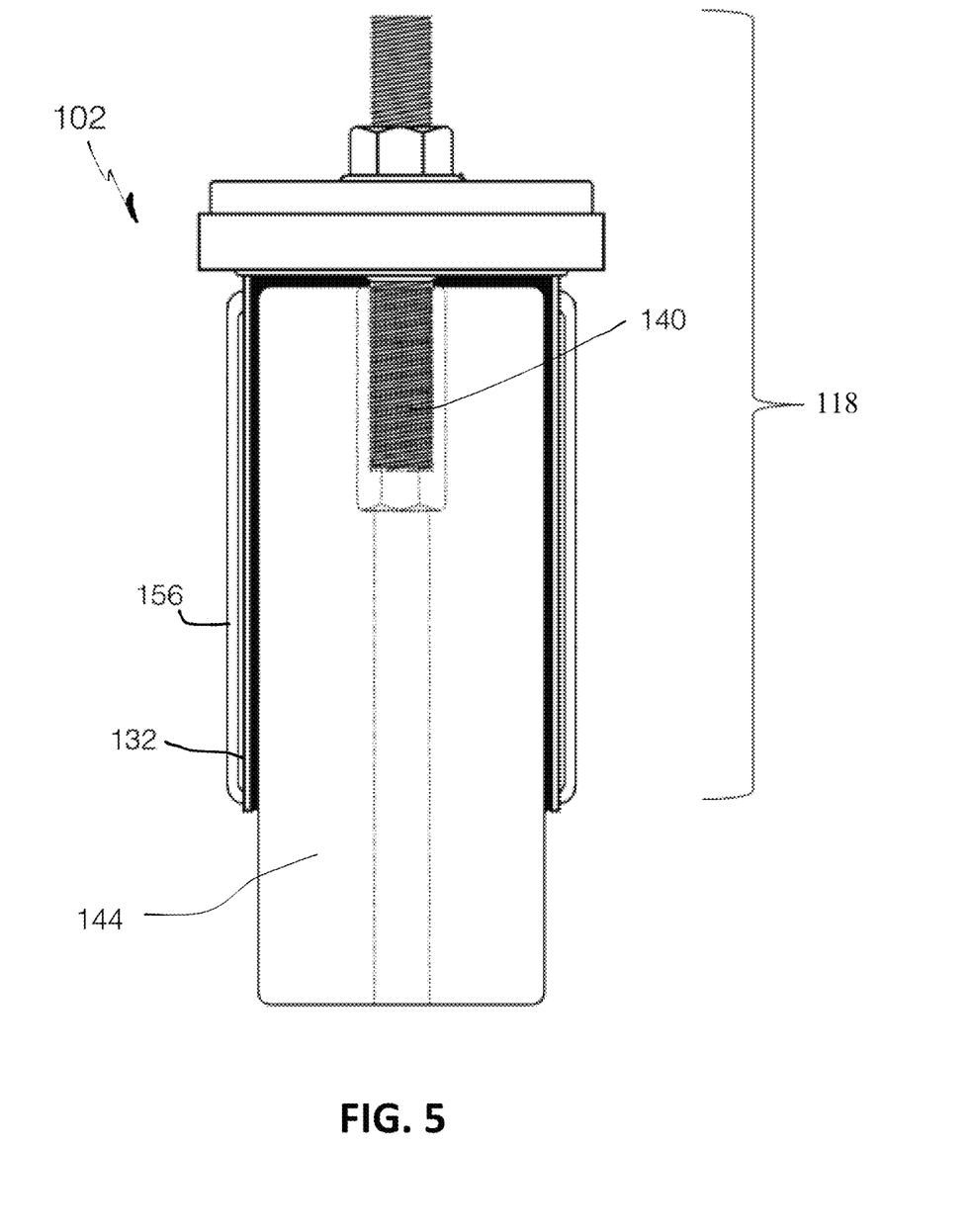
FIG. 5 is a cross-sectional view of FIG. 4.
Figure 6:
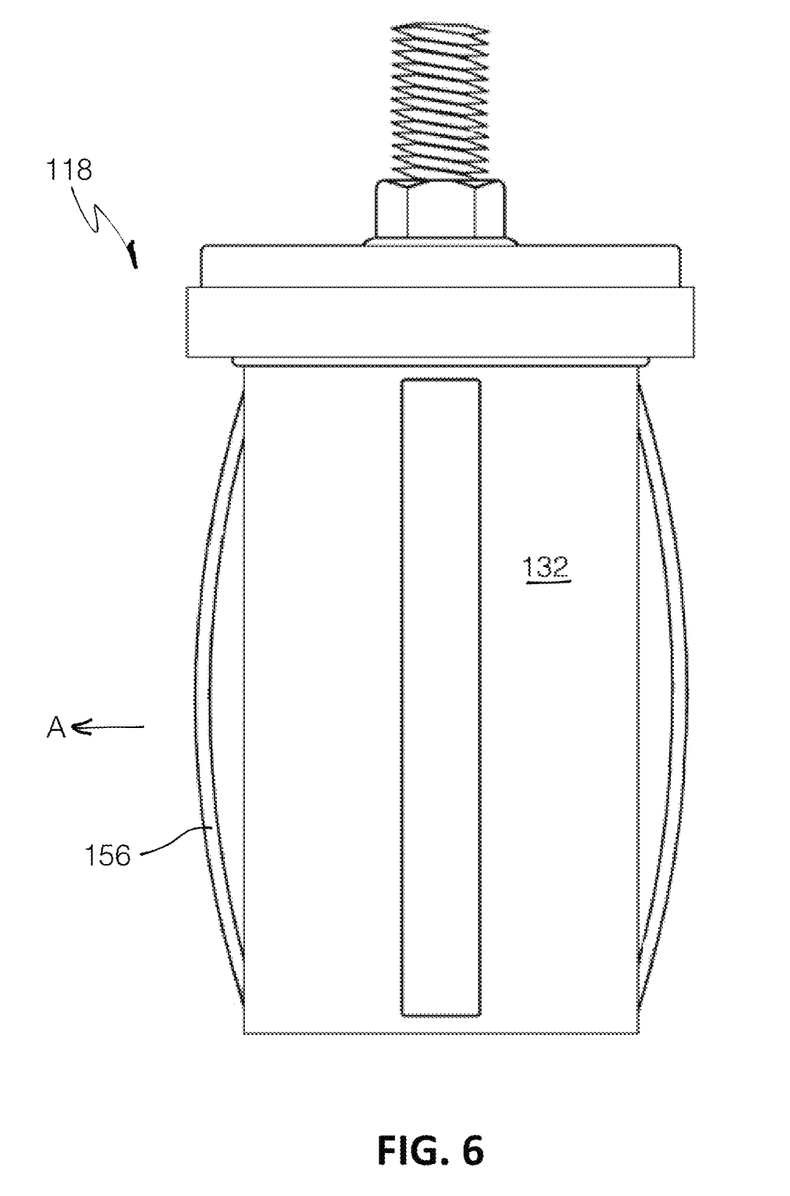
FIG. 6 is a front elevation view of the anode assembly cap of one embodiment of the present invention, wherein interconnected ribs are deflected outwardly.

The wall 132 of one embodiment of the present invention employs at least one rib 156 or ridge extending at least partially along its length. As shown in FIG. 6, the rib(s) 156 can be selectively deformed radially outwardly in the direction of Arrow A to increase the effective outer diameter of the wall. That is, the outer envelope of the cap 102 can be selectively increased to correspond with the inner diameter of the tank's fitting. This feature allows for the cap 102 to fit snugly within the fitting, and may facilitate electron transfer. In addition, the ribs, lying flat or extended as shown in FIGS. 3 and 6, respectively, aid the installer by assisting the anode assembly's alignment as it is placed within the fitting. Other embodiments of the present invention employ ribs that can be removed (in whole or in part) from the wall or selectively separated from itself and bent away from the wall to provide a series of outwardly extending fins that operatively engage the inner surface of the fitting.

Figure 7:
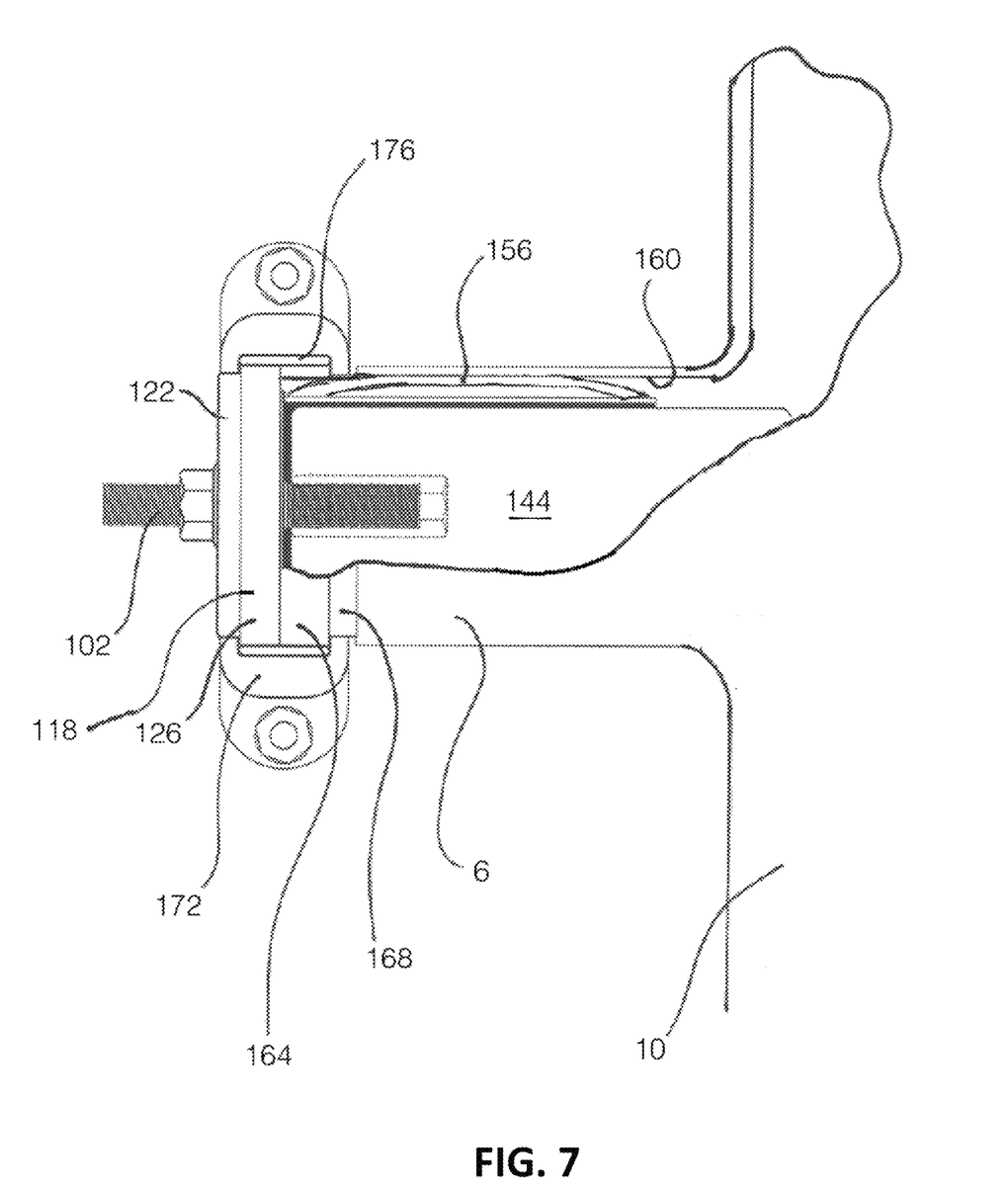
FIG. 7 is a partial cross-section view of the anode assembly of one embodiment of the present invention interconnected to a separator tank.

FIG. 7 shows the anode assembly 102 of one embodiment of the present invention interconnected to a fitting 6 of a separator tank 10. Here, the ribs 156 have been extended such that they touch an inner wall 160 of the fitting 6. Again, this self-aligns the anode within the fitting 6 and thus facilitates electron transfer. The cap 118 of the anode assembly 102 is mated with a flange 164 associated with the fitting 6 with a groove 168 therebetween. A clamp 172 is provided that interfaces with the groove 168/outer clamp portion 122 and inner clamp portion 126 to secure the two components together. A gasket 176 may also be employed to decrease the chance of fluid leakage from the interface between the inner portion 126 of the cap 118 and the fitting flange 164.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. An anode assembly adapted for interconnection to a tank, comprising:
    a cap comprising a flange and a wall extending therefrom that defines an interior volume;
    an anode positioned within the internal volume, wherein a gap exists between an outer surface of the anode and an inner surface of the wall, and wherein the gap is devoid of epoxy; and
    a deformable rib interconnected to an outer surface of the wall, the deformable rib having a first position of use adjacent to the wall and a second position of use spaced radially outwardly from the wall.

2. The anode assembly of claim 1, further comprising a threaded rod extending from the flange, and wherein the rod interconnects to a complementary threaded portion of the anode.

3. The anode assembly of claim 1, wherein the deformable rib is removable.

4. An anode assembly cap adapted for interconnection to a tank, comprising:
    an inner portion and an outer portion, the inner portion having an outer extent greater than an outer extent of the outer portion;
    a wall extending from the inner portion; and
    a deformable member interconnected to an outer surface of the wall, the member having a first position of use adjacent to the wall and a second position of use spaced radially outwardly from the wall.

5. The anode assembly cap of claim 4, wherein the wall defines an internal volume adapted to receive an anode such that a gap exists between an outer surface of the anode and an inner surface of the wall, and wherein the gap is devoid of epoxy.

6. The anode assembly cap of claim 4, further comprising a threaded rod extending from the outer portion, and wherein the rod selectively interconnects to a complementary threaded portion of the anode.

7. The anode assembly cap of claim 4, wherein the deformable member is removable.

8. An anode assembly adapted for interconnection to a tank, comprising:
    a flange;
    a wall extending from the flange and encircling at least a portion of the rod;
    an anode positioned within the wall; and
    a means for increasing an outer diameter of the wall associated with an outer surface of the wall.

9. The anode assembly of claim 8, wherein the means for increasing an outer diameter of the wall has a first position of use adjacent to the wall and a second position of use spaced from the wall.

10. The anode assembly of claim 8, wherein a gap exists between an outer surface of the anode and an inner surface of the wall, wherein the gap is devoid of epoxy.

11. The anode assembly of claim 8, wherein the means for increasing an outer diameter of the wall is removable.

12. The anode assembly of claim 8, further comprising a threaded rod extending from the flange, and wherein the rod interconnects to a complementary threaded portion of the anode.

* * * * *